April 29, 1952 J. A. I. ÖHLUND ET AL 2,594,981
TROLLING SPOON
Filed April 22, 1946
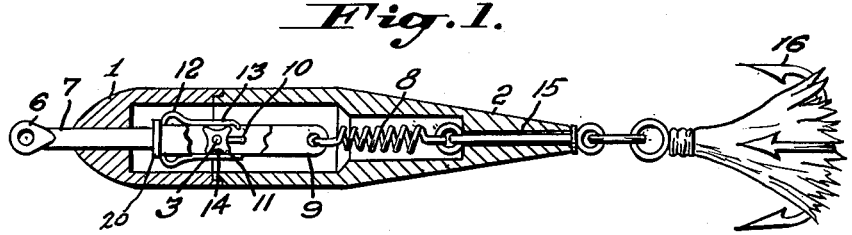
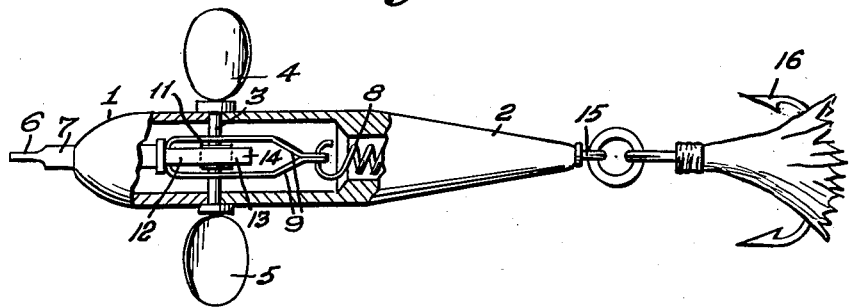
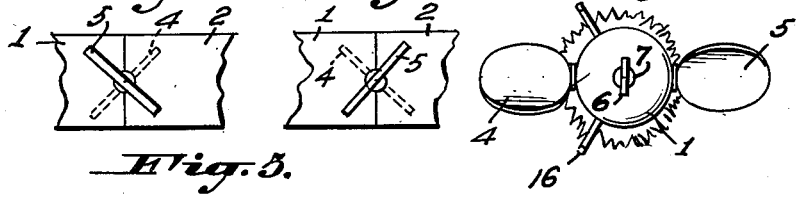
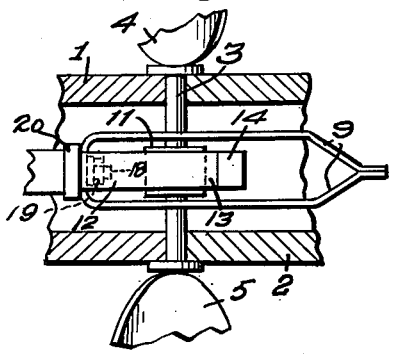
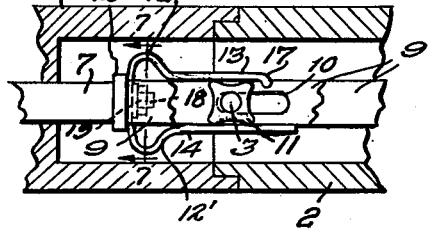
INVENTORS:
Sven Gunnar Bergman
John Alex Ingvar Öhlund
BY
Hancock Downing Seebold
Attorneys.

Patented Apr. 29, 1952

2,594,981

UNITED STATES PATENT OFFICE 2,594,981

TROLLING SPOON

John Alex Ingvar Öhlund and Sven Gunnar Bergman, Linkoping, Sweden, assignors to Torsten Elis Ullman, Helgo, Helgevarma, Sweden Application April 22, 1946, Serial No. 664,092
In Sweden April 25, 1945

3 Claims. (Cl. 43—42.46)

1

This invention relates to artificial bait of the type in which blades are provided for imparting a spinning movement to the bait.

The invention has for its object to provide means actuated each time the fishing line is thrown for reversing the pitch of the blades and the direction of spinning movement of the bait so as to avoid the objectionable consequences of continuously twisting the line in one direction.

In the accompanying drawing wherein an approved embodiment of the invention is illustrated, Figure 1 is a longitudinal sectional view through the bait;

Figure 2 is a view similar to Figure 1 taken at right angles thereto and partly in side elevation;

Figure 3a is a fragmentary side elevation view showing the blades in one position;

Figure 3b is a view similar to Figure 3a but showing the blades in another position;

Figure 4 is an end elevation of the invention;

Figure 5 is an enlarged fragmentary view corresponding to Figure 2;

Figure 6 is an enlarged fragmentary view corresponding to Figure 1; and

Figure 7 is a cross sectional view with parts removed taken on line 7—7 of Figure 6.

Referring to the drawing in detail, the numeral 1 designates a body having a central chamber therein and preferably tapered at the end indicated at 2 and rotatably supporting a diametrical shaft 3 rotatably mounted in the body 1 and provided with blades 4 and 5 fixed to the shaft and located on opposite sides of the body so as to impart a spinning movement thereto when the bait is drawn through the water.

The fishing line (not shown) is attached through the eye 6 at the outer extremity of a stem 7 slidably mounted in the body 1. The stem 7 terminates within the central chamber of the body and is connected by a bail 9 with one end of a coil spring 8, the opposite end of which is attached to a rod 15 looped at its opposite ends and thereby secured against longitudinal movement in the body 1. The tension of the spring 8 normally tends to move the slidable stem 7 inwardly and the movement of the latter is limited in opposite directions by the terminals of slots 10 formed in the opposite sides of the bail 9 and coacting with the shaft 3 which passes through said slots.

The upper exposed extremity of the rod 15 is connected in a suitable manner with one or more fish hooks such as indicated at 16.

2

Between the opposite sides of the bail 9 a ratchet wheel 11 having four teeth thereon is rigidly secured to the shaft 3 and the shaft, together with the blades 4 and 5 secured thereto, is held in an angular position to which it is moved by the tension of a spring 14 secured to the stem 7 and lying against two adjacent teeth of the ratchet wheel 11. A spring pawl 13 having an angular end 17 is engaged with the side of the ratchet wheel 11 opposite the retaining spring 14. As indicated in Figure 7 the bail 9 and the spring arms are preferably formed from a single piece of sheet metal of cruci-form configuration and the four respective arms are bent upward out of the plane of the metal as indicated in the drawing. In Figure 7 the washer for the nut and the threaded extension of the stem 7 have been omitted for purposes of clarity. Two of the arms constitute the bail 9, while the other two arms 13 and 14 are respectively bowed at 12 and 12' adjacent their inner ends to provide resiliency so that they respectively constitute the spring pawl and the retaining spring. The threaded section 18 of the stem 7 extends through a hole in the central portion of the metal piece which constitutes the base from which projects the bail 9 and the oppositely arranged spring pawl 13 and retaining spring 14 and a nut 19 cooperates with this threaded section to hold the assembly of arms against a collar 20 on the stem.

The end 17 of spring pawl 13 cooperates with the teeth of the ratchet wheel or toothed pinion 11 and thereby turns the shaft 3 through an angle of 90° each time the stem 7 is moved outwardly through the body. The retaining spring 14 secures the ratchet wheel 11 in quarter turn position. The successive forward strokes of the slidable stem 7 always rotate the shaft 3 in the same direction. The blades 4 and 5 are so disposed with respect to the teeth of the ratchet wheel 11 that when the latter is turned incident to longitudinal movement of the stem 7, the pitch of the blades is reversed from the position which they formerly occupied, and hence the body 1 is caused to spin in the opposite direction.

In use, the artificial bait is attached to the fishing line (not shown) and in throwing or casting the bait a longitudinal pull is exerted on the slidable stem 7, and the latter moves outwardly against the tension of the spring 8, and in so doing the pawl 13 is caused to turn the shaft 3 and the blades 4 and 5. Thus each time the artificial bait is thrown, the pitch of the blades 4 and 5 is reversed thereby avoiding the continuous spinning of the bait in one direction and the objectionable consequences of twisting the fishing line.

What we claim is:

1. An artificial bait comprising a body, pitched blades mounted on the outside of said body, means for varying the pitch of said blades including a reciprocable member extending into said body and adapted at an exposed end to receive a line, said pitch varying means including a four tooth pinion drivably connected to the blades and means positioned on one side of the pinion and carried by the reciprocable member for rotating said pinion successive quarter turns in one direction for reversing the pitch of the blades and thereby the rotational movement of the bait, coacting means positioned on the other side of the pinion and also carried by the reciprocable member for frictionally engaging the pinion and maintaining said blades in temporarily fixed position between the quarter turn rotation thereof in one direction, and means connected to the reciprocable member for normally returning same to an initially predetermined position.

2. An artificial bait comprising a body having a curved nose and a chamber within the body, a pull member extending through the nose and reciprocable within the chamber adapted to receive a line at its front end and secured to the rear of the body by a biasing spring, a shaft positioned transversely of the body and having oppositely pitched blades fixed on either end exteriorly of the body, a four tooth pinion on said shaft, and a leaf spring having spaced top and bottom leaves mounted on said pull member, said bottom leaf frictionally engaging the pinion, said top leaf being shorter and having a curved end for engaging the pinion and rotating same by quarter turns in the same direction as the pull member is moved longitudinally of the body to change the pitch of said blades to thereby effect reverse rotation of the body as the same is drawn through the water.

3. An artificial bait comprising a body having a curved nose and a chamber within the body, a pull member extending through the nose adapted to receive a line at the front end and reciprocable within the chamber, a pair of parallel spaced apart and vertically positioned structural members having longitudinal slots therein secured at their front ends to said pull member and having their rear ends bent into abutting relationship, a coil spring connected between the rear ends of said structural members and the rear of said body, a transverse shaft through said body and received in the longitudinal slots in said structural members, oppositely pitched blades fixed on the opposite ends of said shaft and positioned exteriorly of the body, a four tooth pinion on said shaft and disposed intermediate the structural members, and a leaf spring having horizontal top and bottom leaves mounted on said pull member, said bottom leaf frictionally engaging the pinion, said top leaf being shorter and having a curved end for engaging the pinion and rotating same by quarter turns in the same direction as the pull member is moved longitudinally of the body to change the pitch of said blades to thereby effect reverse rotation of the body as the same is drawn through the water.

SVEN GUNNAR BERGMAN.
JOHN ALEX INGVAR ÖHLUND.

REFERENCES CITED

The following references are of record in the file of this patent:

UNITED STATES PATENTS

| Number | Name | Date |
| --- | --- | --- |
| 1,393,617 | Frame | Oct. 11, 1921 |
| 1,493,737 | Couse | May 13, 1924 |
| 1,538,658 | Rindt | May 19, 1925 |
| 1,857,312 | Kuehn | May 10, 1932 |
| 2,324,844 | Hutt | July 20, 1943 |
| 2,342,691 | Plensler | Feb. 29, 1944 |

FOREIGN PATENTS

| Number | Country | Date |
| --- | --- | --- |
| 3,007 | Great Britain | of 1889 |